United States Patent [19]

Sue

[11] Patent Number: 4,646,162
[45] Date of Patent: Feb. 24, 1987

[54] DRIVING DEVICE FOR FACSIMILE APPARATUS

[75] Inventor: Takaji Sue, Atsugi, Japan

[73] Assignee: Ricoh Company, Ltd., Tokyo, Japan

[21] Appl. No.: 578,395

[22] Filed: Feb. 9, 1984

[30] Foreign Application Priority Data

Feb. 14, 1983 [JP] Japan .................................. 58-22465

[51] Int. Cl.[4] .............................................. H04N 1/10
[52] U.S. Cl. .................................... 358/293; 358/289;
  358/291; 358/267; 355/13
[58] Field of Search ............... 358/256, 285, 289, 291,
  358/293, 304, 286, 267; 271/121, 228; 318/280,
  281; 355/13, 29

[56] References Cited

U.S. PATENT DOCUMENTS

| | | | |
|---|---|---|---|
| 4,005,257 | 1/1977 | Krallinger et al. | 358/256 |
| 4,013,357 | 3/1977 | Nakajima et al. | 355/29 |
| 4,266,251 | 5/1981 | Hara et al. | 358/286 |
| 4,295,167 | 10/1981 | Wiggins | 358/285 |
| 4,319,282 | 3/1982 | Hartman, Jr. et al. | 358/285 |
| 4,326,222 | 4/1982 | Connin et al. | 358/285 |
| 4,424,535 | 1/1984 | Rothbart et al. | 358/285 |

Primary Examiner—James J. Groody
Assistant Examiner—Edward L. Coles
Attorney, Agent, or Firm—David G. Alexander

[57] ABSTRACT

A driving device for driving document conveying members, recording paper conveying members and recording paper cutting members installed in a facsimile apparatus. The driving device includes first and second reversible motors. The first motor causes the document conveying members to convey a document when in a forward rotation and causes the paper cutting members to cut a recording paper when in a reverse rotation. The second motor causes the paper conveying members to convey the paper when in a forward rotation and to pull it back when in a reverse rotation.

9 Claims, 5 Drawing Figures

DRIVING DEVICE FOR FACSIMILE APPARATUS

BACKGROUND OF THE INVENTION

The present invention relates to a driving device installed in a facsimile apparatus.

A driving device heretofore proposed for a facsimile apparatus includes a single drive source which is shared by both a read system and a write system. A problem encountered with such a type of driving device is that many clutches are required because one of the two systems has to be deactivated while the other is in operation, and because the two systems have to be activated at the same time in a self-test mode of operation, which is particular to a facsimile apparatus. Moreover, the drive source needs be matched with the maximum load which would act thereon in the course of the self-test mode of operation.

Another prior art facsimile driving device includes an exclusive drive source for a cutter. Still another prior art facsimile driving device is constructed to actuate a cutter by reversing the rotation of a drive source which is assigned to a write system. However, the device relying on the reverse rotation of the specific drive source causes the cutter to be driven when a paper is pulled back, resulting in a heavy load acting on the drive source.

SUMMARY OF THE INVENTION

It is therefore an object of the present invention to provide a driving device for a facsimile apparatus which sets up a substantially even distribution of loads acting on drive sources, while simplifying the mechanism.

It is another object of the present invention to provide a generally improved driving device for a facsimile apparatus.

A driving device of the present invention is applicable to a facsimile apparatus which includes a document conveying device for conveying a document, a paper conveying device for conveying a recording paper, and a paper cutting device for cutting the recording paper. The driving device comprises a first drive unit operatively connected to the document conveying device and the paper cutting device to drive the document conveying device and the paper cutting device such that the document is conveyed in a first mode of operation and the recording paper is cut in a second mode of operation, and a second drive unit operatively connected to the paper conveying means to drive the paper conveying device such that the recording paper is conveyed in a first mode of operation and pulled back in a second mode of operation.

In accordance with the present invention, a driving device drives document conveying members, recording paper conveying members and recording paper cutting members installed in a facsimile apparatus. The driving device includes first and second reversible motors. The first motor causes the document conveying members to convey a document when in a forward rotation and causes the paper cutting members to cut a recording paper when in a reverse rotation. The second motor causes the paper conveying members to convey the paper when in a forward rotation and to pull it back when in a reverse rotation.

Other objects, features and advantages of the present invention will become more apparent from the following detailed description taken with the accompanying drawing.

DESCRIPTION OF THE PREFERRED EMBODIMENT

While the driving device for a facsimile apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
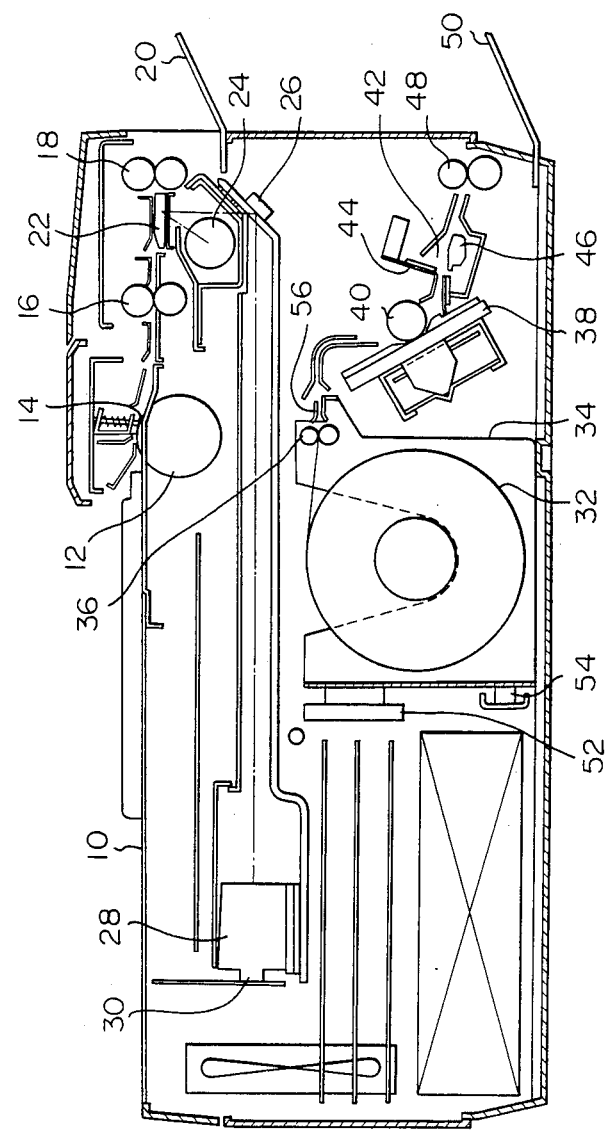
FIG. 1 is a side elevation of a facsimile apparatus to which the present invention is applicable.

Referring to FIG. 1 of the drawing, a transceiver desk-top type facsimile apparatus to which the present invention is applicable is shown. Basically, the facsimile apparatus is arranged to have a read system unit in an upper portion thereof and a write system unit in a lower portion. The read system unit includes a table 10 on which a stack of documents is laid. Separator rollers 12 and a separator plate 14 constitute in combination an automatic document feeder adapted to pull out the documents one by one out of the stack on the table 10. The document is fed by conveyor rollers 16 and 18 toward a tray 20. While moving along a target glass 22 which is interposed between the conveyor rollers 16 and 18, the document reflects light which is emitted from a light source 24. The reflected light has an intensity which varies in accordance with image data. A mirror 26 and a lens unit 28 sequentially steer the reflected light toward a photoelectric transducer element 30 which then converts the incident light into an electric signal.

The write system unit, on the other hand, includes a roll paper unit 34 in which a paper 32 in the form of a roll is received. The paper 32 is paid out of the roll and fed by a manual roller 36 to a recording station. A thermal head 38 is disposed in the recording station to write image data into the paper. A platen roller 40 drives the paper 32 while pressing it against the thermal head 38. The paper 32 coming out from the platen roller 40 is cut by a cutter 42 which is made up of a movable cutting edge 44 and a stationary cutting edge 46, whereupon the cut length of the sheet 32 is fed by discharge rollers 48 to a tray 50. The roll paper unit 34 is movable out of the body of the facsimile apparatus, guided by rails 52 and 54. Such a construction allows one to put a paper roll 32 in the unit 34 after pulling the unit 34 out of the apparatus body, cause the manual rollers 36 to nip the leading end of the sheet 32, cut a needless leading portion of the sheet 32 by means of a manual cutter 56, and then push the unit 34 into the apparatus body.

Figure 2:
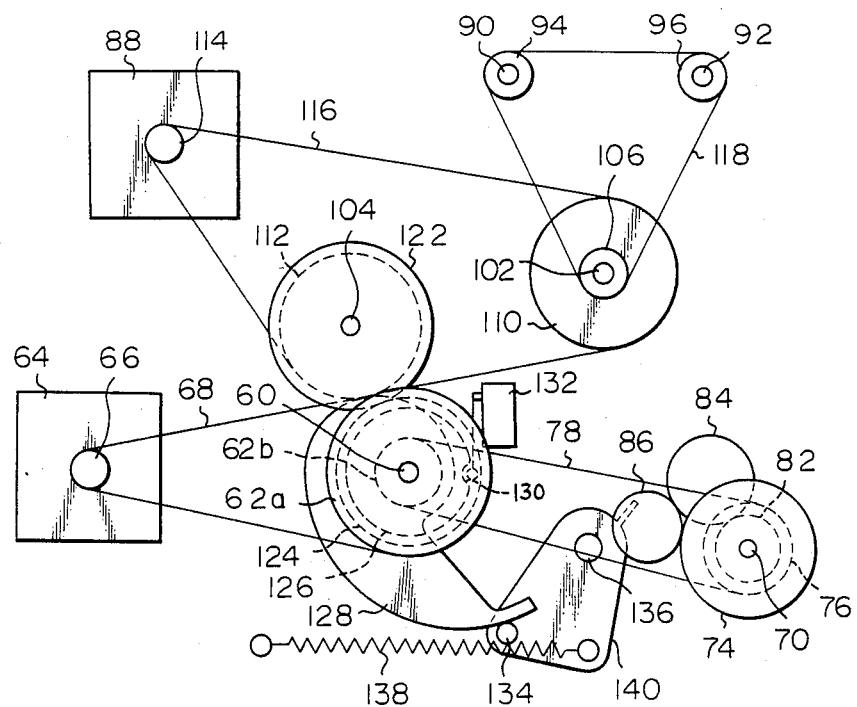
FIG. 2 is a side elevation of a driving device embodying the present invention.
Figure 3:
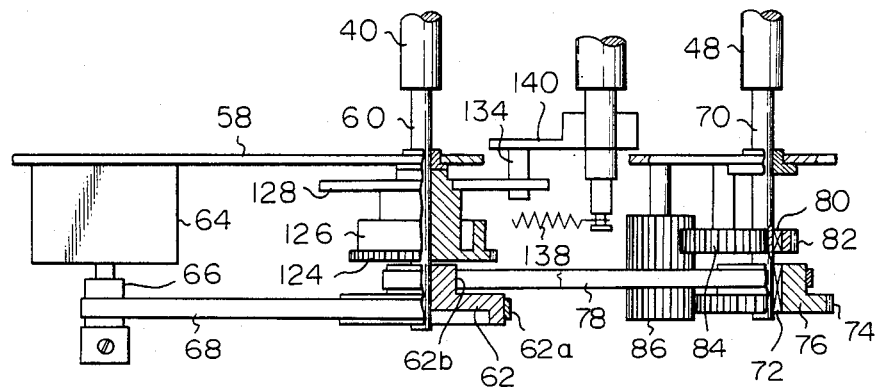
FIG. 3 is a partly taken away plan view of a drive mechanism for a write system shown in FIG. 2.
Figure 4:
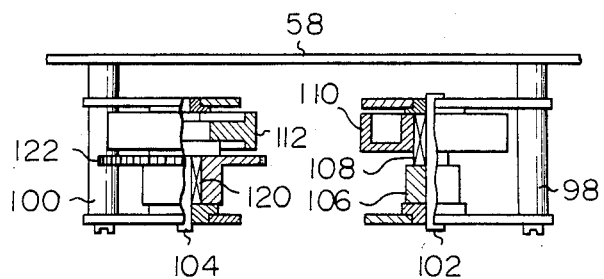
FIG. 4 is a partly taken away plan view of a drive mechanism for a read system shown in FIG. 2.

Referring to FIGS. 2–4, a driving arrangement installed in the facsimile apparatus described above is shown. The platen roller 40 is rigidly mounted on a shaft 60 which is journalled to a side panel 58 of the apparatus body. A dual pulley 62 is also securely mounted on the shaft 60 and comprises a first pulley 62a and a second pulley 62b which is smaller in diameter than the first pulley 62a. A reversible motor 64 is mounted on the side panel 58 to serve as a drive source for the write system. A belt 68 is passed over a motor pulley 66 and the larger pulley 62a of the dual pulley 62. The discharge rollers 48 are mounted on a shaft 70 which is also journalled to the apparatus body. A pulley 76 formed with gear teeth 74 is mounted on the shaft 70 through a one-way clutch 72 and linked with the smaller pulley 62b by a belt 78. A gear 82 is mounted on the shaft 70 through a one-way clutch 80 and operatively associated with the teeth or gear 74 through idle gears 84 and 86.

Meanwhile, a reversible motor 88 is mounted on the side panel 58 of the apparatus body as a drive source for the read system. Pulleys 94 and 96 are rigid on shafts 90 and 92 which carry the conveyor rollers 16 and 18 respectively. Support members 98 and 100 extend from the side panel 58 and support shafts 102 and 104 respectively. A shaft 106 and a pulley 110 are mounted on the shaft 102 with a one-way clutch interposed between the pulley 110 and the shaft 102. Mounted on the shaft 104 is a pulley 112. A belt 116 is passed over the motor pulley 114 and pulleys 110 and 112, while a belt 118 is passed over the pulleys 94, 96 and 106.

A gear 122 is mounted on the shaft 104 through a one-way clutch 120. A gear 124 meshes with the gear 122 and is rotatably mounted on the shaft 60. The gear 124 carries a disc 126 and a cutter cam 128 integrally therewith and one after the other in the axial direction thereof. The disc 126 is formed with a recess 130 in which a switch 132 is engageable for detecting a position as will be described. Designated by the reference numeral 140 is a cutter actuator which is pivotable about a fulcrum 136 and constantly urged by a spring 138 in a cutting direction. A cam follower 134 is studded on the cutter actuator 140 to be actuated by the cutter cam 128.

In operation, as the motor 64 rotates counterclockwise, or forwardly in this embodiment, the platen roller 40 is rotated counterclockwise via the motor pulley 66, belt 68 and pulley 62a to feed the recording paper 32. Under this condition, the cutter cam 128 which is free to rotate relative to the shaft 60 does not follow the rotation of the shaft 60. When the motor 64 rotates clockwise or reversely, it causes the platen roller 40 to rotate in the same direction thereby pulling back the paper 32. Concerning the discharge rollers 48, they are always rotated counterclockwise because the one-way clutches 72 and 80 are individually arranged to transmit a torque to the shaft 70 only when their associated gears 74 and 82 rotate counterclockwise. That is, the discharge rollers 48 are rotated counterclockwise by the pulley 76 during forward rotation of the motor 64 and by the gear 74, idle gears 86 and 84 and gear 82 during reverse rotation of the motor 64.

As to the motor 88, the forward rotation is the clockwise rotation. During forward rotation of the motor 88, the conveyor rollers 16 and 18 are rotated forwardly via the motor pulley 114, belt 116, pulleys 110 and 106, belt 118 and pulleys 94 and 96, thereby feeding a document. The one-way clutch 120 is constructed to prevent the gear 122 from being rotated by the forward rotation of the shaft 104. On reverse rotation of the motor 88, the torque is transmitted to the pulley 110 and not to the shaft 102 due to the presence of the one-way clutch 108, whereby the conveyor rollers 16 and 18 are kept unmoved. However, the gear 122 is rotated counterclockwise to cause the cutter cam 128 to rotate clockwise via the gear 124. Then, the cam follower 134 on the cutter actuator 140 is abruptly released from the cutter cam 128 so that the cutter actuator 140 is bodily moved clockwise by the spring 138 from the position shown in FIG. 2 until the movable edge 44 of the cutter 42 cuts the paper 32. Continuing to rotate, the cutter cam 128 returns the cam follower 134 to the initial position (FIG. 2) with its lobe, whereupon the motor 88 is deenergized. The return of the cam follower 134 to the initial position is sensed by the cooperating switch 132 and the recess 130 of the disc 126.

Figure 5:
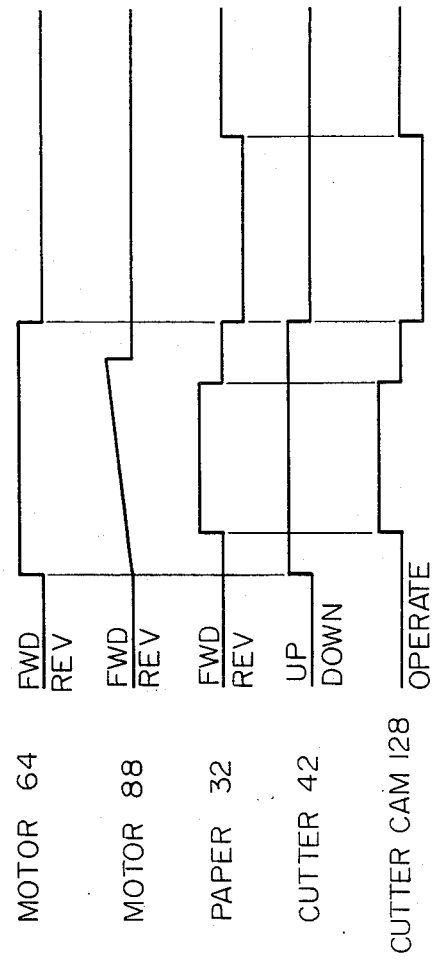
FIG. 5 is a timing chart demonstrating the operation of the driving device of the present invention.

The operation of the driving device described above will be better understood from the timing chart shown in FIG. 5. After the completion of a recording operation, the movement of the paper 32 continues until it reaches the cutter 42. As soon as the paper 32 is stopped, the motor 88 starts a reverse rotation to actuate the cutter 42 to cut the paper 32. The motor 88 continues to reversely rotate after cutting of the paper 32 in order to return the cutter 42 to the initial position. The cut length of the paper 32 is discharged to the tray 50, while the rest of the paper 32 is pulled back until the leading end becomes positioned just below the platen roller 40. The paper 32, therefore, allows no wasteful blank area to develop in the leading end portion thereof.

Thus, in accordance with the embodiment shown and described, the use of two motors 64 and 88 eliminates the need for an exclusive drive source for the cutter 42, while the forward and reverse rotations of the motors 64 and 88 are employed as a trigger to omit on-off clutches heretofore relied on. The device requires a minimum number of one-way clutches and, therefore, achieves a simple construction.

The motor 64 serves to advance the paper when rotated forwardly and to pull it back when rotated backwardly, while the motor 88 serves to advance a document when rotated forwardly and to actuate the cutter when rotated reversely. This sets up a substantially even distribution of loads acting on the drive sources and, thereby, allows them to work with maximum performance.

The drive sources are designed to accommodate the maximum loads. Nevertheless, due to the even distribution of loads the drive sources can be selected with the maximum efficiency eliminating noise or the like due to sharp build-up, which might result from overloading.

In summary, it will be seen that the present invention provides a driving apparatus for a facsimile apparatus which uses two drive sources to attain a simplified construction and substantially uniformalizes leads acting on the drive sources to promote desirable drive.

Various modifications will become possible for those skilled in the art after receiving the teachings of the present disclosure without departing from the scope thereof.

What is claimed is:

1. A driving device for a facsimile apparatus which includes document conveying means for conveying a document, paper conveying means for conveying a recording paper, and paper cutting means for cutting the recording paper, said driving device comprising:

first drive means operatively connected to the document conveying means and the paper cutting means to drive the document conveying means and the paper cutting means such that the document is conveyed in a first mode of operation and the recording paper is cut in a second mode of operation; and second drive means operatively connected to the paper conveying means to drive the paper conveying means such that the recording paper is conveyed in a first mode of operation and pulled back in a second mode of operation;

each of the first and second drive means comprising a reversible motor, said first mode of operation being a forward rotation and said second mode of operation being a reverse rotation.

2. A driving device as claimed in claim 1, in which the document conveying means comprises a first document conveyor roller and a second document conveyor roller, the paper conveying means comprises a platen roller and a discharge roller, and the paper cutting means comprises a movable cutting edge and a fixed cutting edge.

3. A driving device as claimed in claim 2, further comprising a connecting mechanism for operatively connecting the first and second motors, the first and second document conveyor rollers, the platen roller and the discharge roller, and the movable cutting edge to each other.

4. A driving device as claimed in claim 3, in which the connecting mechanism comprises a first pulley mounted on an output shaft of the first motor, a second pulley and a third pulley commonly mounted on a shaft of the platen roller, and a first belt passed over said first and second pulleys.

5. A driving device as claimed in claim 4, in which the connecting mechanism further comprises a first one-way clutch mounted on a shaft of the discharge roller, a fourth pulley mounted on said first one-way clutch and having a first gear, and a second belt passed over said third and fourth pulleys.

6. A driving device as claimed in claim 5, in which the connecting mechanism further comprises a second one-way clutch mounted on the shaft of the discharge roller, a second gear mounted on said second one-way clutch, a first idle gear meshing with said second gear, and a second idle gear meshing with said first idle gear and said first gear.

7. A driving device as claimed in claim 5, in which the connecting mechanism further comprises a fifth pulley mounted on a shaft of the second motor, a first stationary shaft and a second stationary shaft commonly mounted on a body of the facsimile apparatus, a sixth pulley mounted on said first stationary shaft, a seventh pulley mounted on said second stationary shaft, a second one-way clutch mounted on the second stationary shaft, an eighth pulley mounted on said second one-way clutch, a third belt passed over the fifth, sixth and eighth pulleys, a nineth pulley mounted on a shaft of the first document conveyor roller, a tenth pulley mounted on a shaft of the second document conveyor roller, and a fourth belt passed over the second, nineth and tenth pulleys.

8. A driving device as claimed in claim 7, in which the connecting mechanism further comprises a third one-way clutch mounted on the first stationary shaft, a second gear mounted on said third one-way clutch, a third gear rotatably mounted on the shaft of the platen roller and meshed with said second gear, a disc and a cutter cam which are integral with said third gear, a cam follower actuated by said cutter cam, and a spring constantly biasing said cam follower in a direction for cutting the paper.

9. A driving device as claimed in claim 8, in which the connecting mechanism further comprises a recess formed in the disc and a switch triggered by said recess, said recess and said switch cooperating to sense a stop position of the disc.

* * * * *